United States Patent

[11] 3,628,512

| [72] | Inventor | Tao-Yuan Wu<br>Ann Arbor, Mich. |
|---|---|---|
| [21] | Appl. No. | 63,353 |
| [22] | Filed | Aug. 13, 1970 |
| [45] | Patented | Dec. 21, 1971 |
| [73] | Assignee | Ford Motor Company<br>Dearborn, Mich. |

[54] INDUCTION SYSTEM FOR A V-TYPE INTERNAL COMBUSTION ENGINE
8 Claims, 5 Drawing Figs.

[52] U.S. Cl. .................................... 123/52 MV,
123/55 VE
[51] Int. Cl. .................................... F02b 75/18,
F02b 75/22
[50] Field of Search ........................... 123/52 MV,
55 VS, 55 VE, 52 M, 52 MB

[56] References Cited
UNITED STATES PATENTS

| 2,762,350 | 9/1956 | Mann et al. ............... | 123/55 VE |
| 2,806,457 | 9/1957 | Moseley ..................... | 123/52 MV |
| 2,915,049 | 12/1959 | Armstrong et al. ......... | 123/52 MV |
| 2,857,893 | 10/1958 | Lobdell ..................... | 123/52 MV |

FOREIGN PATENTS

| 1,167,132 | 11/1958 | France ..................... | 123/52 MV |

*Primary Examiner*—Wendell E. Burns
*Assistant Examiner*—Richard Rothman
*Attorneys*—John R. Faulkner and Glenn S. Arendsen ABSTRACT: An intake manifold has a plenum chamber defined in part by a floor located substantially perpendicular to and directly below the induction passages of a carburetor. Runners connecting the plenum chamber with the end cylinders of each bank open into the plenum chamber through sidewalls extending above the floor while runners connecting the plenum chamber with intermediate cylinders open into the plenum chamber through the peripheral portions of the floor. The manifold improves fuel and air distribution and also improves driver control over engine torque.

INVENTOR
TAO-YUAN WU
BY
John R. Faulkner
Glenn S. Arendsen
ATTORNEYS

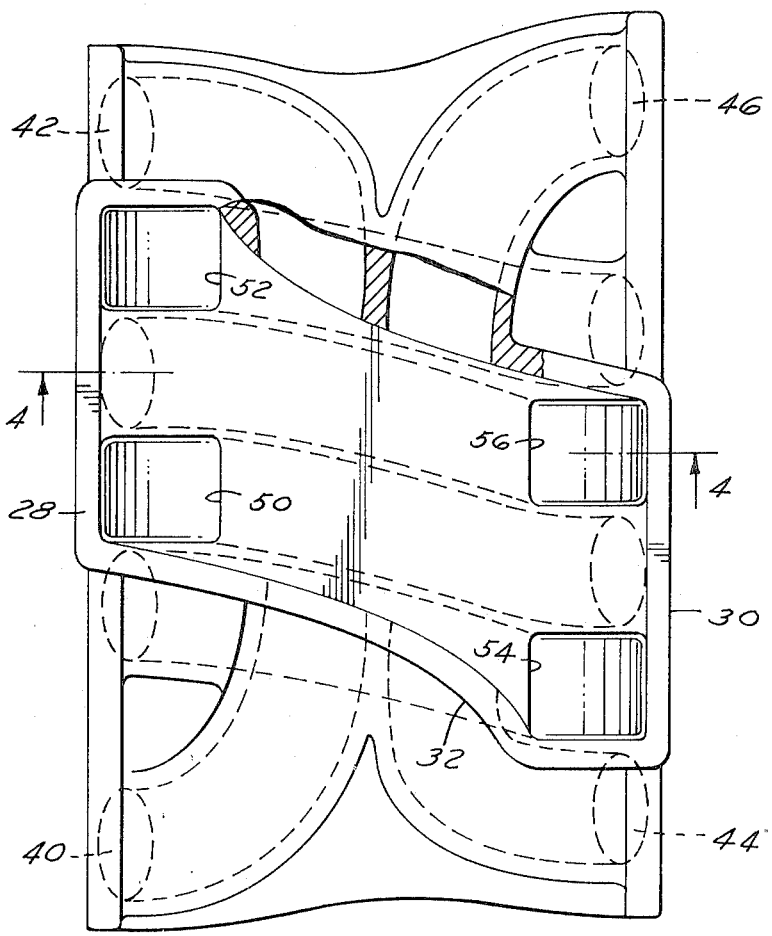
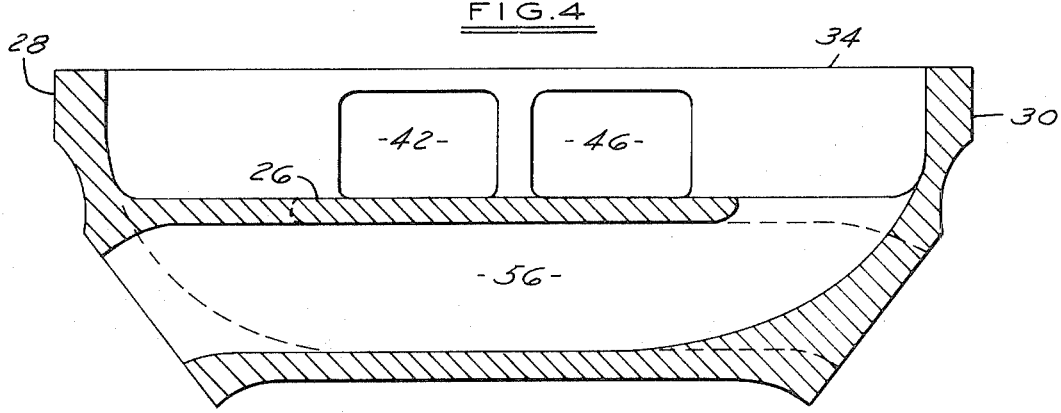

INDUCTION SYSTEM FOR A V-TYPE INTERNAL COMBUSTION ENGINE

SUMMARY OF THE INVENTION

Induction systems for V-8 engines have used for many years an arrangement in which one carburetor venturi supplied fuel and air to one bank of cylinders and a separate carburetor venturi supplied fuel and air to the other bank. The intake manifold of such arrangements, commonly called an over-under manifold, includes small plenum chambers located at different vertical levels that receive the fuel-air mixture from the respective venturi and distribute the mixture to runners leading to the individual cylinders. Since the runners feeding the intermediate cylinders of each bank were shorter than the runners feeding the end cylinders, intermediate cylinders tend to receive disproportionately rich fuel-air mixtures while end cylinders generally receive an unduly lean mixture. Additionally, since each cylinder is supplied by only one venturi, the total capacity of the carburetor is not utilized by any of the cylinders.

Developments undertaken recently for purposes of improving engine performance and reducing undesirable exhaust emissions have resulted in a variety of alternate induction systems. In general, these systems attempt to use runners of different sizes and shapes to achieve ram charging of the combustion chamber and to equalize fuel-air distribution. None has been entirely satisfactory mainly because of poor performance in all but a very narrow speed range.

This invention provides a compact induction system that produces excellent fuel-air distribution throughout a wide speed range and broadens the peak of the torque curve to provide better driver control. The system is for a V-type internal combustion engine having two banks of cylinders with two end cylinders and at least one intermediate cylinder in each bank. A multiventuri carburetor for producing fuel-air mixture is mounted on an intake manifold that conducts the fuel-air mixture to the combustion chambers. The intake manifold has a plenum chamber located directly below the carburetor induction passages and defined in part by a floor substantially perpendicular to the induction passages with upstanding walls substantially parallel to the induction passages. Runner passages connect each cylinder with the plenum chamber and conduct the fuel-air mixtures from the plenum chamber to the cylinders. The runner passages connecting the end cylinders to the plenum chamber open into the plenum chamber through its sidewalls while the runner passages connecting with the intermediate cylinders open into the plenum chamber through the peripheral portions of the floor.

The carburetor preferably is mounted on the plenum chamber so that its induction passages supply the fuel-air mixture to the center portion thereof. Those runner passages connecting the plenum chamber with the end cylinders open into the plenum chamber so that entrances face the portion subtended by the carburetor induction passages. Runner passages feeding the intermediate cylinders open through the floor of the chamber so the entrances thereof face in directions parallel to but removed from the subtended portion. The runner passages feeding the intermediate cylinders of each bank preferably enter the plenum chamber on the side adjacent the opposite bank.

BRIEF DESCRIPTION OF THE DRAWINGS

FIG. 3 is a partially sectioned top view of the intake manifold.

FIG. 4 is a cross section taken along line 4—4 of FIG. 3 that shows the openings of the runners leading to the end cylinders and a cross section of an intermediate runner passage.

DETAILED DESCRIPTION

Figure 1:
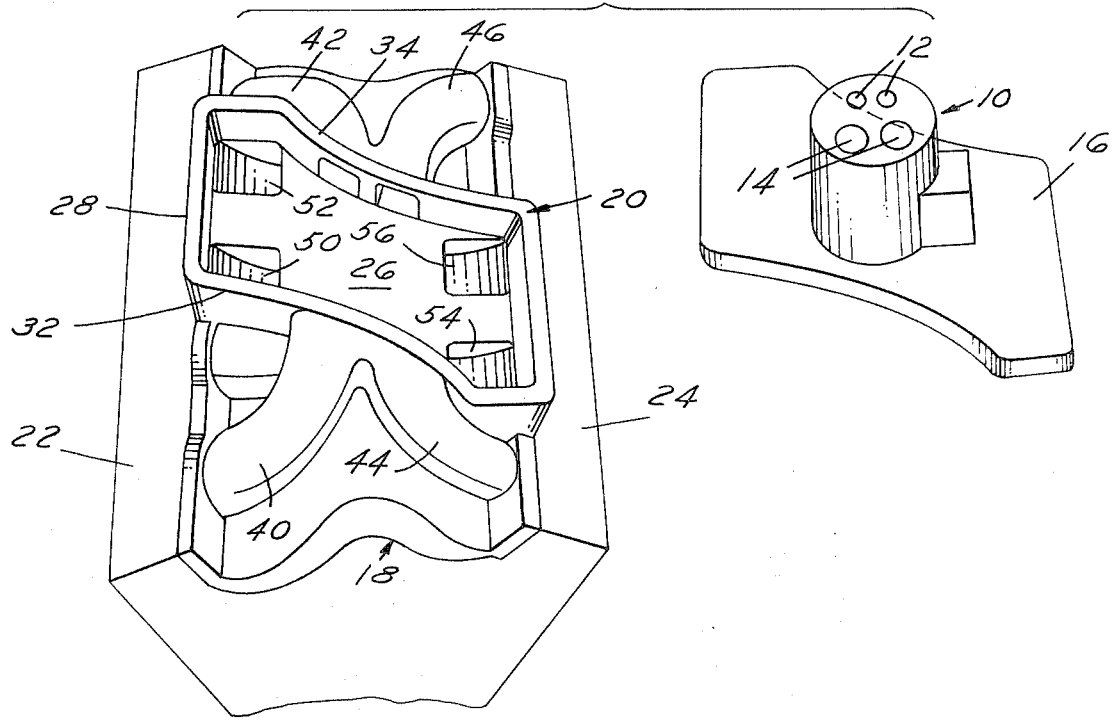
FIG. 1 is an exploded perspective view of the carburetor and intake manifold of the induction system of this invention that shows the plenum chamber openings of the runner passages.

Referring to the drawings, a multiventuri carburetor 10 having two primary induction passages 12 and two secondary induction passages 14 is mounted on a plate 16. Plate 16 is fastened by conventional means to the top of an intake manifold 18 so the plate serves as the upper surface of a plenum chamber 20. Manifold 18 is mounted between the cylinder banks 22 and 24 of a V-8 type internal combustion engine.

Plenum chamber 20 is defined by a floor 26 that extends substantially perpendicular to induction passages 12 and 14. Longitudinal sidewalls 28 and 30 combine with lateral sidewalls 32 and 34 to complete the plenum chamber. Sidewalls 28 through 34 extend substantially parallel to the axes of carburetor induction passages 12 and 14.

An individual runner passage connects each engine cylinder with plenum chamber 20. Runner passages 40 and 42 thus connect the end cylinders of cylinder bank 22 with the plenum chamber and runner passages 44 and 46 connect the end cylinders of cylinder bank 24 with the plenum chamber. Runner passages 42 and 46 open into the plenum chamber through sidewall 34 and runner passages 40 and 44 open into the plenum chamber through sidewall 32. The entrances to each of runner passages 40–46 substantially face the central position of the plenum chamber, which is subtended by the carburetor venturis. Each runner passage 40–46 has an arcuate shape as shown in FIG. 3.

Figure 2:
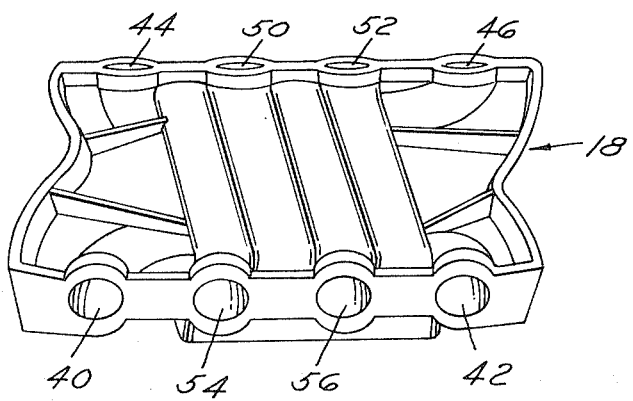
FIG. 2 is a bottom view of the intake manifold that shows the crossover arrangement of those runner passages connecting the plenum chamber to the intermediate cylinders.

Runner passages 50 and 52 connect the intermediate cylinders of cylinder bank 24 with plenum chamber and runner passages 54 and 56 connect the intermediate cylinders of cylinder bank 22 with the plenum chamber. Runners 50 and 52 open into the plenum chamber through the peripheral portions of the floor adjacent wall 28, which also is adjacent cylinder bank 22. Runners 54 and 56 open in a similar manner through the peripheral portion of the floor 26 adjacent cylinder bank 24. Each of runners 50–56 is substantially straight for most of its length and each passes beneath at least a part of the plenum chamber as illustrated best in FIGS. 2 4.

Plate 16 is mounted on the plenum chamber so the axes of carburetor induction passages 12 and 14 intersect the center portion of the floor of the plenum chamber. The openings of runner passages 40–46 substantially face the center portion while the openings of runner passages 50–56 are removed therefrom. Fuel-air mixture from the carburetor induction passages is inducted with approximately equal ease into each runner passage. Plenum chamber size is sufficiently small to maintain good fuel entrainment and good mixture distribution throughout the entire engine speed range.

Figure 5:
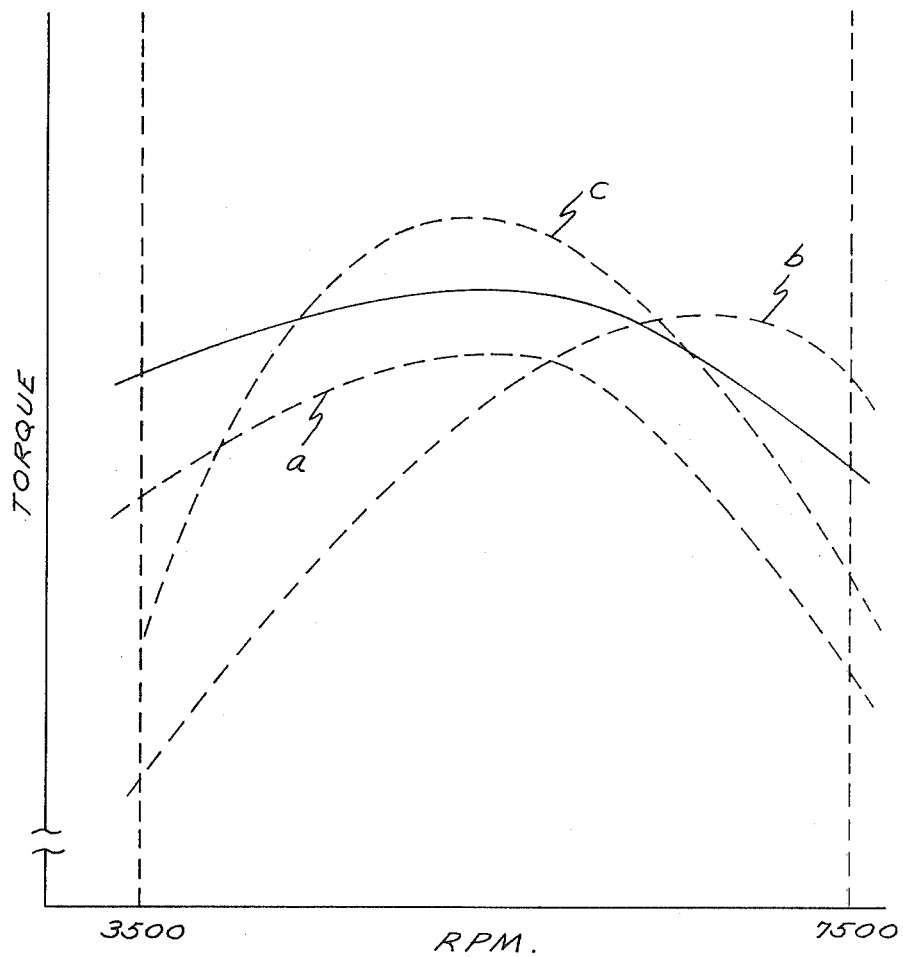
FIG. 5 is a graph displaying for comparative purposes of the approximate engine torque curves of the intake manifold of this invention and several types of prior art manifolds.

FIG. 5 illustrates the approximate torque curves of several intake manifolds. The solid line represents the torque achieved by the intake manifold and induction system of this invention. Line a represents the torque curve of the same engine-carburetor combination but with the conventional over-under manifold. Similarly, line b represents the combination with a single plane manifold in which all runner passages enter the plenum in the same plane and each faces the carburetor induction passages to an equal degree. Line c represents the combination with the commonly known T-box manifold in which runners of equal length open into a relatively large plenum chamber. Note that the system of this invention provides more uniform torque and increases the torque at all speeds except the peaks of some of the comparable manifolds.

Thus this invention provides an induction system for a V-type engine that improves overall engine performance. Each engine cylinder is supplied by all carburetor venturis and each cylinder receives a larger, more uniform fuel-air mixture. The system reduces engine exhaust emissions and increases torque output and control.

I claim:

1. An induction system for a V-type internal combustion engine having two banks of cylinders with two end cylinders and at least one intermediate cylinder in each bank comprising
carburetor means for producing a fuel-air mixture, said carburetor means having a plurality of substantially parallel induction passages, and
an intake manifold for conducting the fuel-air mixture to the combustion chambers, said intake manifold comprising
an attachment means for mounting said carburetor means,
a plenum chamber directly below said attachment means, said plenum chamber defined by a floor substantially perpendicular to the induction passages of the carburetor and upstanding sidewalls substantially parallel to said induction passages, and
passage means connecting each cylinder with said plenum chamber for conducting fuel-air mixtures to the cylinders, the passage means connecting with the end cylinders opening into the plenum chamber through the sidewalls and the passage means connecting with the intermediate cylinders opening into the plenum chamber through the floor.

2. The system of claim 1 in which the passage means connecting with an intermediate cylinder of one bank passes underneath the plenum chamber floor and opens into the plenum chamber adjacent the other bank.

3. The system of claim 2 in which the openings into the plenum chamber of the passage means connecting with the end cylinders face the portion of the plenum chamber subtended by the carburetor induction passages.

4. The system of claim 3 in which the openings into the plenum chamber of the passage means connecting with the intermediate cylinders face parallel to the carburetor induction passages but are removed from the portion of the plenum subtended by the carburetor induction passages.

5. The system of claim 4 in which the passage means connecting with the end cylinders are arcuate and the greater portions of the passage means connecting with the intermediate cylinders are substantially straight.

6. The system of claim 1 in which the openings into the plenum chamber of the passage means connecting with the end cylinders face the portion of the plenum chamber subtended by the carburetor induction passages.

7. The system of claim 1 in which the openings into the plenum chamber of the passage means connecting with the intermediate cylinders face parallel to the carburetor induction passages but are removed from the portion of the plenum subtended by the carburetor induction passages.

8. The system of claim 1 in which the passage means connecting with the end cylinders are arcuate and the greater portions of the passage means connecting with the intermediate cylinders are substantially straight.

* * * * *